July 1, 1969 — I. J. BUCKLAND — 3,452,517
APPARATUS FOR THE EXTRACTION OF HYDROGEN FROM GAS MIXTURES
Filed Feb. 28, 1967
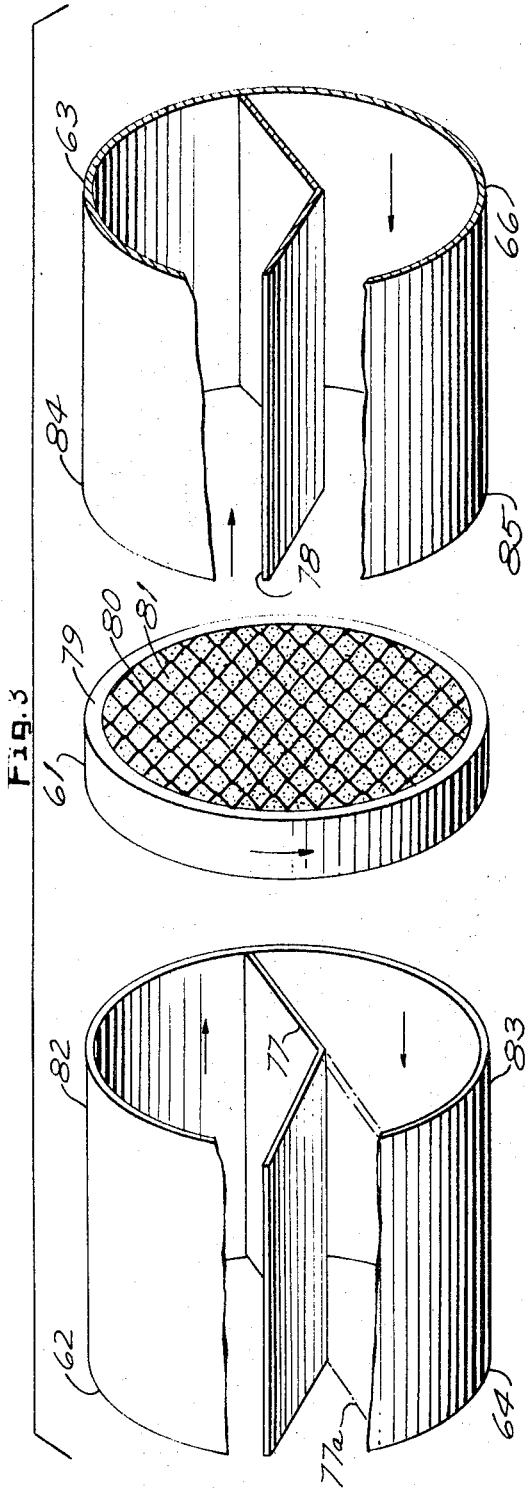
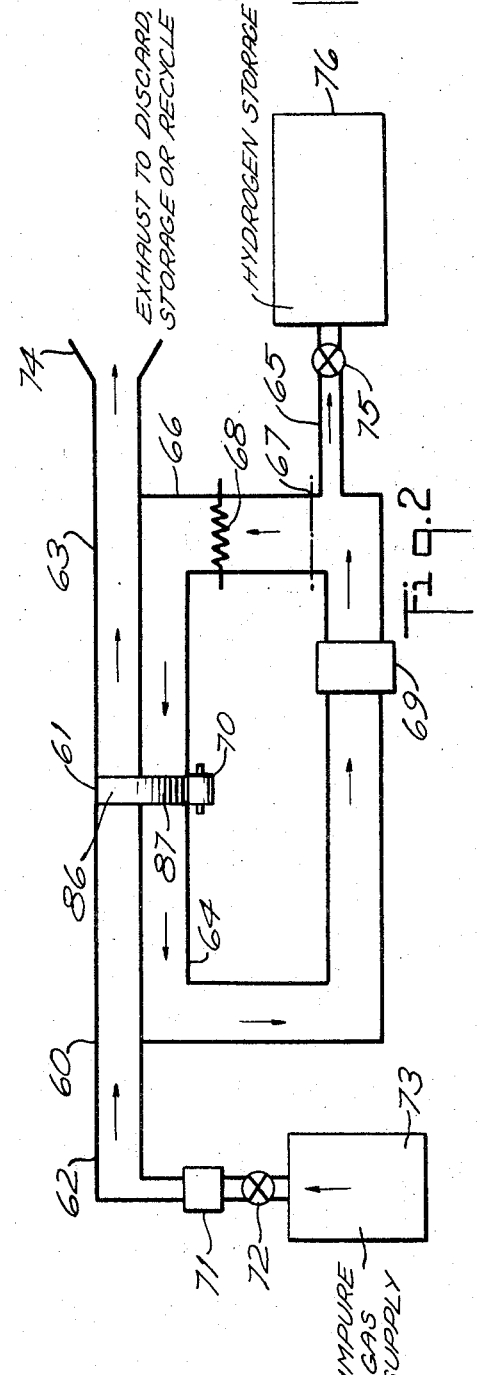
INVENTOR.
IVOR JOHN BUCKLAND
BY
M. L. Pinel
ATTORNEY

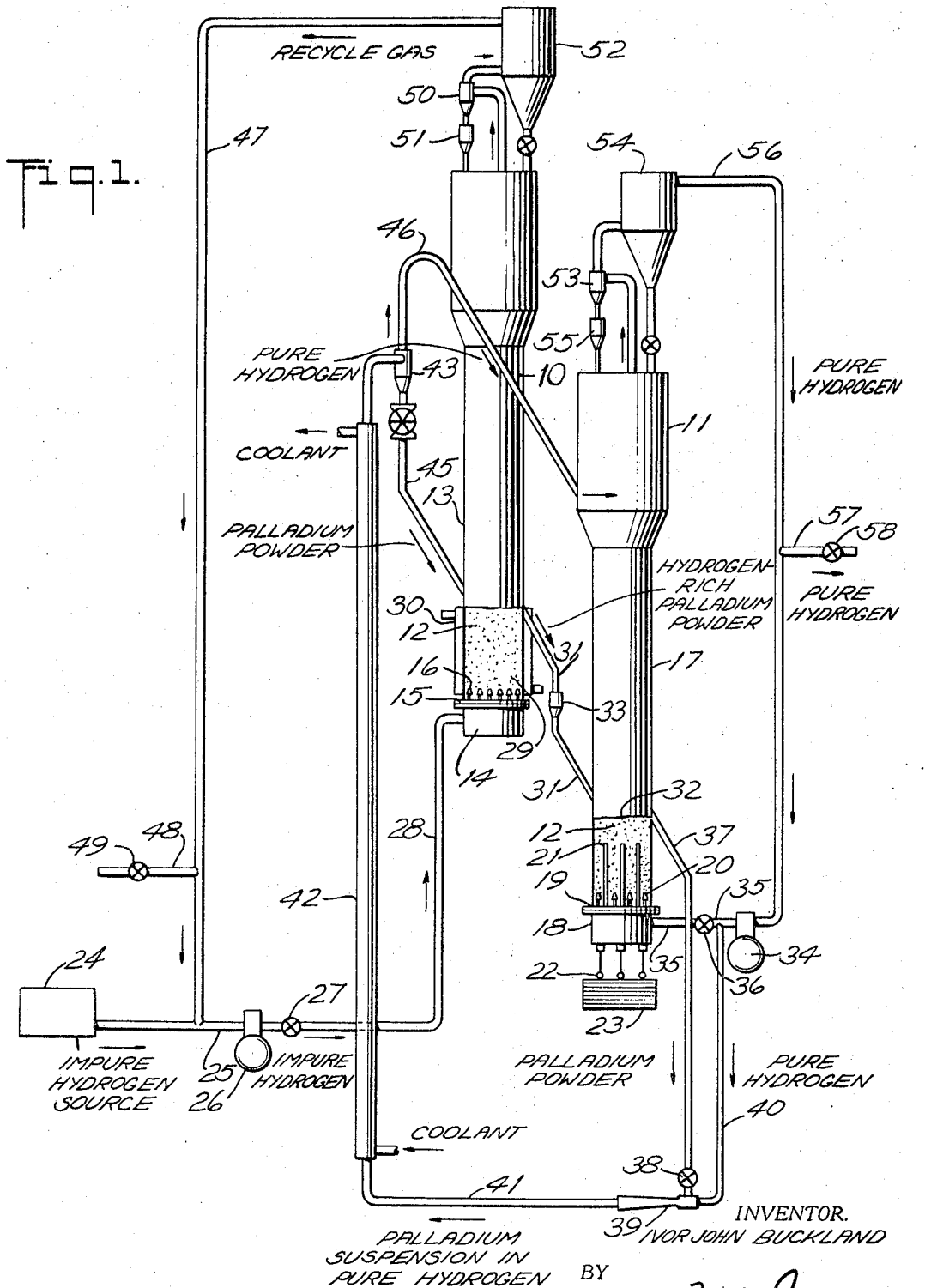

United States Patent Office 3,452,517
Patented July 1, 1969

3,452,517
APPARATUS FOR THE EXTRACTION OF HYDROGEN FROM GAS MIXTURES
Ivor John Buckland, Chalfont St. Peter, England, assignor to The International Nickel Company, Inc., New York, N.Y., a corporation of Delaware
Filed Feb. 28, 1967, Ser. No. 619,354
Claims priority, application Great Britain, Mar. 4, 1966, 9,652/66
Int. Cl. B01d 13/00, 53/00
U.S. Cl. 55—158  4 Claims

ABSTRACT OF THE DISCLOSURE

Hydrogen is obtained from mixtures of hydrogen and one or more other gases by absorption of hydrogen into palladium from a gas mixture in an absorption zone and then moving the palladium to a desorption zone where the pressure of the atmosphere around the palladium is decreased and/or the temperature of the palladium is increased, as compared with conditions in the absorption zone, and hydrogen is then desorbed from the palladium.

---

The present invention relates to obtaining gaseous hydrogen and, more particularly, to recovery of hydrogen from gaseous mixtures comprising hydrogen and one or more other gases.

Hydrogen in the usual gaseous molecular form, generally referred to herein simply as hydrogen, is of commercial value in many industrial processes, e.g., as a protective atmosphere in processes for heat treating metals. It is well known that hydrogen is present in a variety of industrial gas mixtures. For instance, cracked ammonia contains substantial amounts of hydrogen in addition to nitrogen and some residue gases obtained in the refining of petroleum contain hydrogen mixed with gaseous hydrocarbons. For many years there has been need for means to recover hydrogen or hydrogen enriched gases from gas mixtures on a commercially satisfactory basis. Although previous attempts to overcome this problem may have had some modest degree of success, results obtained heretofore have not been wholly satisfactory due to a variety of undesirable features such as low efficiency, small rates of separation and/or high costs of providing and/or maintaining the needed apparatus.

Although many attempts were made to overcome the foregoing difficulties and disadvantages, none, as far as I am aware, was entirely successful when carried into practice commercially on an industrial scale.

There has not been discovered a new process and a new apparatus which enable improved commercially satisfactory recovery of hydrogen from mixtures with other gases.

It is an object of the present invention to provide a process for extracting hydrogen from mixtures of hydrogen and one or more other gases.

Another object of the invention is to provide apparatus for separating hydrogen from a gaseous mixture.

Other objects and advantages will become apparent from the following description taken in conjunction with the accompanying drawing in which:

FIGURE 1 depicts a fluid bed embodiment of apparatus which the invention provides for extracting hydrogen; and FIGURES 2 and 3 illustrate a rotational extractor embodiment of apparatus within the scope of the invention.

Generally speaking, the present invention contemplates extracting gaseous hydrogen from a mixture of hydrogen with other gas by introducing palladium and a gas mixture which contains hydrogen into a hydrogen absorption zone and then moving the palladium into a hydrogen desorption zone while controlling conditions of temperature and pressure in the absorption zone and desorption zone to provide the hydrogen is absorbed in the palladium when in the absorption done and is desorbed from the palladium when in the desorption zone. After desorption, the hydrogen is withdrawn from the desorption zone. For example, when extracting hydrogen with palladium according to the invention, the palladium is moved cyclically through absorption and desorption vessels or compartments of a vessel, the mixture of gases being passed through the absorption vessel or compartment and hydrogen or hydrogen enriched gas being withdrawn from the desorption vessel or compartment. The absorption or desorption can be carried out continuously or intermittently but preferably continuously. Palladium employed in the process of the invention can be palladium sponge, solid palladium metal, palladium powder, a palladium-rich alloy or inert particles coated with palladium or palladium alloy (all of which for convenience are referred to herein as palladium). Inasmuch as the capability of palladium to absorb and desorb substantial quantities of hydrogen is well known and effects of pressure and temperature on such absorption and desorption, e.g., that absorption of hydrogen in palladium is promoted by increases in the hydrogen pressure (or partial pressure thereof) in an atmosphere surrounding palladium whereas desorption is promoted by decreases in pressure and/or increases in temperature, are also known, those skilled in the art will readily understand that in accordance with the present invention the pressure in the absorption zone is controlled to be relatively high and/or the temperature in the absorption zone is controlled to be relatively low in relation to temperature and pressure conditions in the desorption zone.

When the palladium is in the form of powder, it is desirably fluidized in an absorption compartment or vessel by means of the gas mixture from which hydrogen is to be extracted. The resulting suspension of powder particles can be carried from the absorption compartment by the gas and separated therefrom in a cyclone, from which the powder passes into the desorption compartment or vessel and is then returned to the absorption compartment or vessel. Advantageously, however, the powder is fluidized as a dense phase in an absorption compartment, overflows from this into a desorption compartment and is returned to the bottom of the absorption compartment. The desorption zone can be a compartment comprising one or more tubes down which the particles descend under gravity though if desired the tube or tubes can be provided with driving means, such as an Archimedian screw, to move the powder. The desorbed hydrogen is removed from the tube or tubes and this can be effected by providing reduced pressure in the desorption compartment to facilitate desorption. However, in this type of embodiment employing palladium powder, the absorption and desorption are primarily effected by variations in temperature and the tube (or each tube) of the desorption compartment can be surrounded by a heating coil to raise the temperature of the powder that has left the fluidized bed. In recycling the powder, the temperature of the powder must, of course, be reduced again in order to allow absorption to take place in the fluidized bed and to this end the lower part of the tube or each tube can be surrounded by a cooling coil. In addition, the incoming gas to be treated can be at or cooled to a low temperature.

The gas which is being treated can be passed more than once through the absorption compartment and for this purpose a suitable connection can be provided between the gas outlet and the gas inlet of the absorption zone.

If the gas recovered from the desorption zone is not pure hydrogen but merely rich in hydrogen, it can be passed through a second similar apparatus to effect further purification.

The powder particles entering the tube or tubes in the absorption compartment may form effective gas seals by which the entry of the gas to be treated into the desorption compartment is prevented.

In other embodiments of the new process, a palladium surface on a rotating disc or drum is moved alternately into and out of absorption and desorption zone compartments which are arranged alongside or around the rotating disc or drum so that the moving palladium surface serves as a wall, or a portion of a wall, for the compartments and is thus cyclically exposed to different conditions of temperature and/or pressure which are maintained in the absorption and desorption compartments. For obtaining rapid efficient recovery of hydrogen when the process is performed using such or similar mechanical means for moving of palladium, desorption is most advantageously effected wholly or mainly by controlling the pressure in the desorption compartment to be less than the pressure in the absorption compartment.

Further, if the palladium is employed in the form of a disc, the compartments can be separated from one another by a slotted partition and the disc may rotate within the slot in the partition. The absorption and desorption compartments can in effect be conduits through one of which the gas to be treated flows at a pressure higher than that in the other which contains the desorption zone from which the desorbed hydrogen is withdrawn.

Palladium discs for the process can be made of pure palladium sponge or of a palladium alloy or of solid palladium. The disc should have a high surface area of palladium and a porous structure is preferred.

In another mode of performing the process the palladium forms the cylindrical surface of a drum which rotates about its axis. Absorption and desorption compartments are arranged radially and alternately around the periphery of the drum so that each part of the surface becomes a boundary wall first of an absorption compartment and next of a desorption compartment and then again of an absorption compartment and so on. All the absorption compartments can be connected to a common header and all the desorption compartments can be connected to a common manifold.

In carrying the invention into practice, it is desirable to control the pressures such that only a small difference in pressure exists between the absorption and desorption zones and to obtain the recovery of the hydrogen in the desorption zone by maintaining a large temperature difference between the two zones.

For the purpose of giving those skilled in the art a better understanding of the invention and appreciation of the advantages of the invention, the following illustrative examples of the process and apparatus of the invention are given.

Referring now to the drawing, FIG. 1 illustrates in a partial cutaway view an illustrative example of thermal-cycling hyrogen-extraction apparatus having upper fluidizer 10, which provides a hydrogen absorption zone, lower fluidizer 11, which provides a hydrogen desorption zone, and palladium powder bodies 12 in each fluidizer. Absorption fluidizer 10 comprises fluid bed chamber 13, wind box 14, distributor plate 15 and bubble cap nozzles 16. Desorption fluidizer 11 comprises fluid bed chamber 17, wind box 18, distributor plate 19, bubble cap nozzles 20 and electric heating elements 21. (For relatively small diameter chambers the distributor plate can be of sintered metal whereas for large diameter chambers a steel distributor plate fitted with bubble cap nozzles is preferable.) Heater element leads 22 are connected to electric power source 23. When the apparatus is in operation, impure hydrogen, i.e., a gaseous mixture of hydrogen and one or more other gases, flows from gas mixture source 24 through conduit line 25, is compressed by compressor 26 and is fed through valve 27 and through conduit 28 to wind box 14. From wind box 14 impure hydrogen flows through openings (not shown) in distributor plate 15, around stems of bubble cap 16 and thence into hydrogen absorption zone 29 in absorbing fluid bed chamber 13. Palladium particles in the absorption zone are blown by the impure hydrogen to provide a palladium powder fluid bed in the hydrogen absorption zone. In the absorption zone, temperature and pressure are controlled with the aid of cooling jacket 30 and the compressor and valves associated with the absorption fluidizer so that hydrogen is selectively absorbed from the gas mixture by the palladium. Hydrogen-rich palladium flows by gravity through conduit 31 to hydrogen desorption zone 32 in desorbing fluid bed chamber 17. Flap valve (check valve) 33 prevents back flow of gas or palladium from the desorption zone to the absorption zone. In the desorption zone pure (or substantially pure) hydrogen, which flows successively from hydrogen compressor 34 through conduit 35, valve 36, wind box 18, distributor plate 19 and around the stems of bubble caps 20 into the desorption zones, fluidizes the palladium particles 12 in chamber 17 to form a desorbing palladium powder fluid bed. Temperature and pressure in the desorbing zone are controlled with the aid of the electric heaters, hydrogen compressor and valves associated with the desorbing chamber so that pure hydrogen is desorbed from the hydrogen-laden palladium which enters the desorbing chamber from conduit 31. From the desorbing fluidizer, hydrogen-depleted palladium powder flows through overflow standpipe 37 and powder circulation valve 38 to ejector 39, which is operated by pure hydrogen from conduit 40. Hydrogen-depleted palladium is forced from the ejector through palladium-return conduit 41, wherein cooling of the powder is effected by cooler 42 around conduit 41, to low-pressure-drop cyclone separator 43, which unloads the powder from the hydrogen carrier gas. Palladium powder from cyclone 43 moves through rotary valve 44 and conduit 45 so that the palladium is recycled to the absorption zone. Hydrogen from cyclone 43 is recycled to fluidizer 11 through conduit 46. Hydrogen-depleted gas in absorbing fluidizer 10 flows upwardly through and out of chamber 13 and is returned through recycle gas conduit 47 to the impure hydrogen stream in conduit 25. Purge line 48, which is controlled by valve 49, communicates with the recycle gas conduit. Hydrogen-rich palladium powder is removed from the recycle gas stream by cyclone 50 and is returned to the absorbing zone through flap valve 51. The recycle gas is cleaned further in filter 52. In the desorbing chamber hydrogen is driven off from hydrogen-rich palladium. The thus-extracted hydrogen then passes upwardly out of the desorption chamber and through cyclone 53 and filter 54, which are mounted at the top of the desorption chamber and which remove hydrogen-depleted palladium particles from the outwardly moving hydrogen stream. Powder from cyclone 53 is returned to the desorbing zone through flap valve 55. Extracted and filtered hydrogen from the desorbing zone passes through conduit 56. A portion of the extracted hydrogen is recycled through compressor 34 so as to be sent back into the desorbing zone via conduits 37 and 40. Additional extracted hydrogen is tapped off through hydrogen collection conduit 57 and valve 58 and is collected for use.

Owing to the mixing of palladium powder particles in the fluid beds neither the regeneration or absorption process is completed in all the particles leaving the upper and lower fluidizers but this does not seriously affect the process except to increase the heat consumption. Large outputs are possible by maintaining a large volume of powder in circulation.

The process is continuous and once set in operation requires little instrumentation or attention, although periodic maintenance may be needed in event of erosion of the ejector, powder gas piping and rotary valve.

In an illustrative example of carrying out the process of the invention with use of apparatus such as is illustrated by FIG. 1, the absorption zone is maintained at about 120° C. and about 15 p.s.i. and the desorption zone is maintained at about 250° C. and about 15 p.s.i. Palladium particles of sizes in the range of about 40 microns to about 50 microns are cycled and recycled from the absorption zone to the desorption zone and from the desorption zone back to the absorption zone and so on. A gas mixture containing about 75% hydrogen and about 25% nitrogen, is fed into the apparatus at the gas mixture source and commercially pure hydrogen is collected from the hydrogen collection conduit.

Referring next to FIG. 2, apparatus 60 (illustrated schematically) is an illustrative example of hydrogen-extraction apparatus having a mechanically movable palladium-carrying member. Apparatus 60 comprises rotatable palladium-carrying disc 61, gas mixture feed conduit 62, gas mixture exhaust conduit 63, hydrogen removal conduit 64, hydrogen collection conduit 65 and hydrogen recycle conduit 66. The hydrogen recycle conduit communicates with the hydrogen removal conduit at 67 Apparatus 60 also comprises electric resistance heater 68, hydrogen pump 69 and rotator drive 70 for rotating disc 61. Gas mixture pump 71 and valve 72 enable transmitting an impure hydrogen gas mixture from impure hydrogen source 73 into the gas mixture feed conduit at controlled pressure. Exhaust gas exit 74 can be open so as to discard the exhaust gas or can be connected to an exhaust gas storage facility or to a recycle conduit feeding back to the impure hydrogen source. Extracted purified hydrogen is tapped from the hydrogen collection conduit through valve 75 and collected in hydrogen storage tank 76, to which suitable valves and pipe lines can be connected for withdrawing hydrogen as desired.

FIG. 3 shows an exploded, enlarged perspective view of the rotatable disc and of conduit portions that are closely associated with the disc. The exploded view in FIG. 3 shows feed-removal separator 77 and exhaust-recycle separator 78. Disc 61 comprises a ceramic ring 79, e.g., a ceramic ring 32 centimeters (cm.) in outside diameter, 30 cm. in inside diameter and 1.25 cm. in width, fine honeycomb 80, which is made of stainless steel, in the interior of the ring and a porous mass of palladium powder 81, e.g., about one kilogram of palladium powder, which is packed in the honeycomb. Thus, disc 61 forms a movable palladium-containing body. If desired, the honeycomb can be of ceramic or other heat-resistant material instead of stainless steel. The conduit portions near the disc have cylindrically curved outer shells such that outer shells 82 and 83 together form a cylindrical tube with a circular cross-section of the same internal diameter as the internal diameter of ring 79. Similarly, outer shells 84 and 85 together form a cylindrical tube with a circular cross-section of the same internal diameter as ring 79. Each separator divides the contacting cylinder into two portions having cross-sections which are sectors of a circle. Thus shell 82 and separator 77 form a feed gas inlet sector while shell 83 and separator 77 form a hydrogen removal sector. Similarly, shell 85 and separator 78 form a hydrogen recycle sector. In a refined form of the apparatus a small sectorial compartment 77a within the shell 83 may be set aside as a purge conduit in which gas in the interstices of the palladium 81 in the disc 61 is allowed to escape prior to the main body of hydrogen in the palladium being desorbed. Close fitting of the shells and the separators with corresponding portions of the rotatable disc effectively seal the feed conduit from the hydrogen recovery conduit and similarly seal the exhaust conduit from the recycle conduit and also seal the conduit interiors from the outside atmosphere. Of course, additional sealing components and bearing members, and other rotator means, e.g. a driven shaft through the centers of the disc and the separators, can be employed if desired. Inasmuch as the paired conduits are partially coextensive, they form bifurcated conduits. Again referring to FIG. 2, it is to be particularly noted that at any given moment when the apparatus is operating to extract hydrogen in accordance with the invention, that portion of the disc interior which corresponds to, and is fed from, the feed gas inlet sector forms part of the absorption chamber and thus contains hydrogen absorption zone 86; at the same time, that portion of the disc interior which corresponds to, and feeds into, the hydrogen removal sector forms part of the desorption chamber and thus contains hydrogen desorption zone 87. The palladium-packed honeycomb controls gas flow in the disc so as to be generally transverse to, and not parallel to, the plane of the disc. Rotation of the disc moves palladium in the disc successively from absorption to desorption to absorption zones, and so on, to cycle and recycle the palladium alternately through these two different zones. Palladium in the desorption zone is heated by hot recycle hydrogen, which is heated by heater 68, and palladium in the absorption zone is cooled by the inlet gas mixture, which is at least initially cooler than the heated recycle hydrogen. Other possible means for heating the disc sector in the desorption zone include induction heating, particularly when the honeycomb is of an electrically conductive material, and circulation of heated hydrogen. Rotational speed of the disc and heat input to the disc are controlled so as to obtain desired temperatures for absorption and desorption in the respective zones.

In an illustrative example of a hydrogen extraction process performed in accordance with the invention with apparatus of the type illustrated by FIGS. 2 and 3, the feed gas mixture is supplied to the absorption zone at a hydrogen partial pressure of 1.3 atmospheres and a similar pressure is maintained at the hydrogen removal exit from the desorption zone. The palladium-containing disc is cooled to 100° C. in the absorption zone and is heated to 190° C. in the desorption zone. The feed gas conduit and the exhaust gas conduit are formed with cross sections that provide feed gas inlet and exhaust gas sectors, respectively, which are each of 144° central angle at the faces of the disc. The hydrogen removal conduit and the hydrogen recycle conduit are each formed with cross sections that provide hydrogen removal and hydrogen recycle sectors which are each of 216° central angle at the faces of the disc. The disc is rotated at 2.4 revolutions per minute. Substantially pure hydrogen is obtained at a rate of 200 cubic feet per hour.

In another example of hydrogen extraction performed with apparatus of the type illustrated by FIGS. 2 and 3, the feed gas mixture is supplied to the absorption zone at a hydrogen partial pressure of 1.3 atmospheres and a similar pressure is maintained at the hydrogen removal exit from the desorption zone. The palladium-containing disc is cooled to 100° C. in the absorption zone and is heated to 250° C. in the desorption zone. The feed gas conduit and the exhaust gas conduit are formed with cross sections that provide feed gas inlet and exhaust gas sectors, respectively, which are each of 240° central angle at the faces of the disc. The hydrogen removal conduit and the hydrogen recycle conduit are each formed with cross sections that provide hydrogen removal and hydrogen recycle sectors which are each of 120° central angle at the faces of the disc. The disc is rotated at 4 revolutions per minute. Substantially pure hydrogen is obtained at a rate of 340 cubic feet per hour.

In view of the hereinbefore referred to descriptions, examples and illustrations pertaining to hydrogen-extraction apparatus it is apparent that the invention provides hydrogen-extraction apparatus comprising a movable palladium body capable of absorbing and desorbing hydrogen, an absorption chamber, a desorption chamber, means for limiting gas flow from one chamber to the other and movement means, e.g., a gravity flow tube, a gas blower device or a rotor, such as a drive shaft, a gear drive or a friction drive on a wheel, for moving the palladium body from one chamber to the other. Of course, it is highly advantageous to have the apparatus protect the palladium from the ambient atmosphere during transfer of the palladium from one chamber to the other and to provide that the transfer is accomplished without substantially change in the hydrogen/palladium concentratiton ratio in the palladium. It is to be observed that very satisfactory means for such advantageous protection and transfer are provided in the foregoing examples of fluid bed apparatus and rotating body apparatus of the invention. Additionally, the hydrogen extractor provided herein has means for controlling temperature-pressure conditions in at least one of the chambers, advantageously in both chambers, so as to enable obtaining a difference between the temperature-pressure conditions in the two chambers such that the temperature-pressure condition in the absorption chamber provides an equilibrium hydrogen/palladium concentration ratio that is greater than the equilibrium hydrogen/palladium concentration ratio obtained with the temperature-pressure condition in the desorption chamber.

In connection with the latter two foregoing examples, which relate to hydrogen extraction with rotating disc apparatus, it will be understood that the temperature-pressure condition of 100° C. and 1.3 atmospheres hydrogen pressure that is present at the feed inlet sectors, and thus in the absorption zone, in these two examples enables obtaining a hydrogen/palladium concentration ratio (in palladium) that is higher than either of the hydrogen/palladium concentration ratios obtained with the temperature-pressure conditions of 190° C. and 1.3 atmospheres hydrogen pressure and of 250° C. and 1.3 atmospheres hydrogen pressure that are present at the hydrogen removal sectors, and thus in the desorption zones, in these two examples.

The present invention is particularly applicable to extracting hydrogen from gas mixtures such as inter alia cracked ammonia and refinery off-gas.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim.

1. An apparatus for extracting hydrogen from a gaseous mixture containing hydrogen and another gas comprising a first chamber for absorbing hydrogen and a second chamber for desorbing hydrogen, a movable body comprising particulate palladium, a mechanically movable carrier member having said body attached thereto, a driving means operable to actuate said carrier member to move said body from the first chamber to the second chamber, a gas inlet to the first chamber, a gas exit from the second chamber, means for limiting flow of gas from the first chamber to the second chamber, means for controlling the temperature-pressure condition in at least one of said chambers to enable obtaining in one chamber a temperature-pressure condition different from the temperature-pressure condition existing in the other chamber and means for collecting desorbed hydrogen from the gas exit from the second chamber.

2. An apparatus as set forth in claim 1 wherein the carrier member is a rotatable drum and the driving means is adapted to rotate the drum to carry the movable body from the first chamber to the second chamber.

3. An apparatus as set forth in claim 1 wherein the carrier member is a rotatable disc and the driving means is adapted to rotate the disc to carry the movable body from the first chamber to the second chamber.

4. An apparatus as set forth in claim 1 wherein the particulate palladium is in the form of palladium sponge.

References Cited

UNITED STATES PATENTS

| | | | |
|---|---|---|---|
| 2,391,334 | 12/1945 | Nicholson | 55—79 |
| 2,637,625 | 5/1953 | Garbo | 55—16 |
| 2,824,620 | 2/1958 | De Rosset | 55—16 |
| 2,993,563 | 7/1961 | Munters et al. | 55—34 |
| 3,155,467 | 11/1964 | Yamamoto et al. | 55—16 |
| 3,217,471 | 11/1965 | Silverman | 55—387 |

FOREIGN PATENTS 697,318 11/1964 Canada.

REUBEN FRIEDMAN, *Primary Examiner.*

CHARLES N. HART, *Assistant Examiner.*